United States Patent
Oo et al.

(10) Patent No.: US 11,819,966 B2
(45) Date of Patent: Nov. 21, 2023

(54) REPAIR METHODS AND SYSTEMS FOR HONEYCOMB STRUCTURES IN GAS TURBINE ENGINES

(71) Applicant: Raytheon Technologies Corporation, Farmington, CT (US)

(72) Inventors: Guolin Oo, Singapore (SG); Garimella Balaji Rao, Singapore (SG)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/828,751

(22) Filed: May 31, 2022

(65) Prior Publication Data

US 2023/0061452 A1  Mar. 2, 2023

Related U.S. Application Data

(62) Division of application No. 17/187,008, filed on Feb. 26, 2021, now Pat. No. 11,370,070.

(51) Int. Cl.
| | | |
|---|---|---|
| *B23K 1/00* | (2006.01) | |
| *B23K 3/08* | (2006.01) | |
| *B23K 101/02* | (2006.01) | |
| *F01D 11/00* | (2006.01) | |

(Continued)

(52) U.S. Cl.
CPC ............ *B23P 6/002* (2013.01); *B23K 1/0014* (2013.01); *B23K 1/0018* (2013.01); *B23K 3/087* (2013.01);
(Continued)

(58) Field of Classification Search
CPC .. B23K 1/0014; B23K 2101/02; B23K 3/087; B23K 1/0018; B23K 2101/001;
(Continued)

(56) References Cited

U.S. PATENT DOCUMENTS 2,962,811 A * 12/1960 Herbert, Jr. ......... C23C 18/1644
                                                      205/228
3,001,274 A   9/1961 Price et al.
(Continued)

FOREIGN PATENT DOCUMENTS

| EP | 2612951 | 7/2013 |
|---|---|---|
| EP | 3299114 | 3/2018 |
| KR | 102097612 | 4/2020 |

OTHER PUBLICATIONS

USPTO; Notice of Allowance dated Apr. 15, 2022 in U.S. Appl. No. 17/187,008.

(Continued)

*Primary Examiner* — Matthew P Travers
(74) *Attorney, Agent, or Firm* — SNELL & WILMER L.L.P.

(57) ABSTRACT

A method of applying a braze component to a honeycomb structure may comprise: applying at least a partial vacuum within a chamber, the chamber defined at least partially by a vacuum device and a cover, the honeycomb structure disposed within the chamber, the braze component disposed between the honeycomb structure and the cover; pulling the cover towards the braze component in response to applying the partial vacuum; and pulling the braze component into a plurality of hexagonal cells defined by the honeycomb structure in response to pulling the cover towards the braze component.

8 Claims, 5 Drawing Sheets

(51) Int. Cl.
*F01D 11/12* (2006.01)
*B23K 101/00* (2006.01)
*B23P 6/00* (2006.01)

(52) U.S. Cl.
CPC .... *B23K 2101/001* (2018.08); *B23K 2101/02* (2018.08); *F01D 11/001* (2013.01); *F01D 11/127* (2013.01); *F05D 2230/237* (2013.01); *F05D 2230/80* (2013.01); *F05D 2240/55* (2013.01)

(58) Field of Classification Search
CPC .......... F05D 2230/237; F05D 2230/80; F01D 11/127; F01D 11/001; F01D 2240/55; B23P 6/002; Y10T 29/49318; Y10T 29/49719
See application file for complete search history.

(56) References Cited

U.S. PATENT DOCUMENTS

| | | | |
|---|---|---|---|
| 3,046,648 A | 7/1962 | Kelly | |
| 3,091,684 A * | 5/1963 | Cochran | B23K 1/0014 219/85.17 |
| 3,173,813 A * | 3/1965 | Dewey | B23K 1/0014 148/528 |
| 3,412,917 A * | 11/1968 | Omley | B23K 1/0014 228/44.3 |
| 3,656,224 A * | 4/1972 | Blair | B23K 1/0014 228/248.1 |
| 3,722,071 A | 3/1973 | Van Orsdel | |
| 3,737,978 A * | 6/1973 | Rathbun | B23K 1/0014 228/221 |
| 3,844,027 A | 10/1974 | Hagen et al. | |
| 4,449,714 A | 5/1984 | Meier | |
| 5,702,050 A | 12/1997 | Oono | |
| 2006/0261136 A1 | 11/2006 | Sano | |
| 2020/0316701 A1 | 10/2020 | Bienvenu | |

OTHER PUBLICATIONS

USPTO; Requirement for Restriction/Election dated Dec. 21, 2021 in U.S. Appl. No. 17/187,008.

European Patent Office, European Search Report dated Aug. 31, 2022 in Application No. 22155874.5.

* cited by examiner

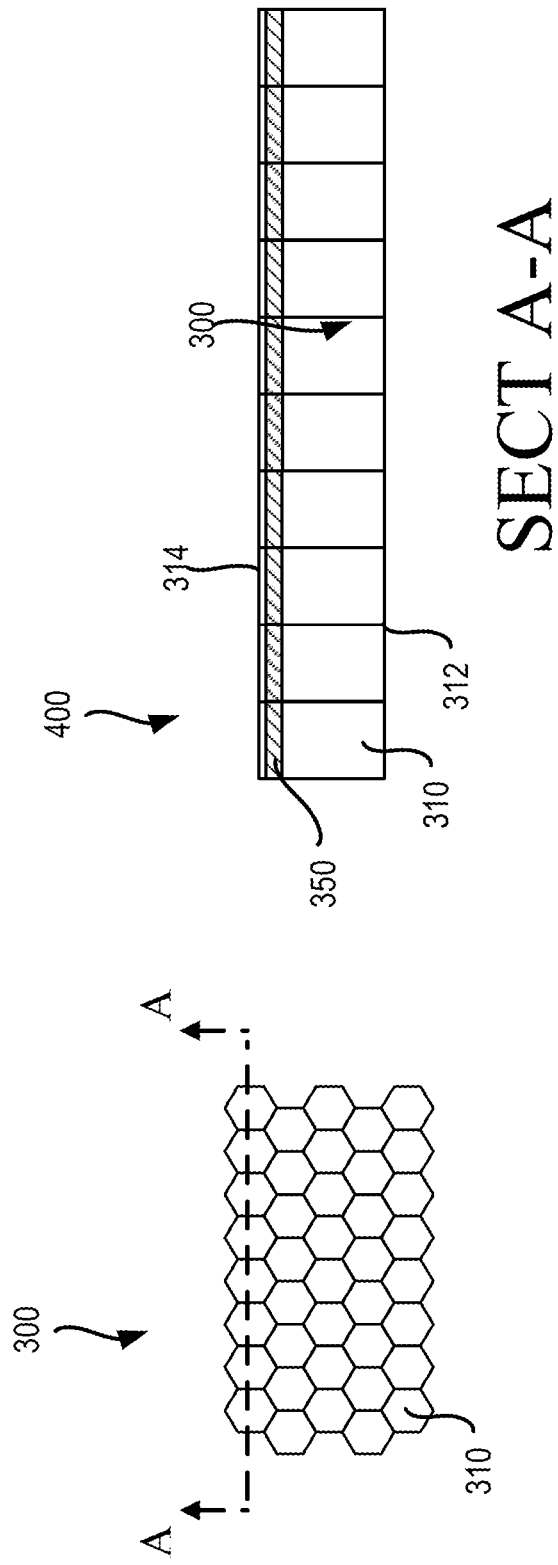

REPAIR METHODS AND SYSTEMS FOR HONEYCOMB STRUCTURES IN GAS TURBINE ENGINES

CROSS-REFERENCE TO RELATED APPLICATIONS

This application is a divisional of, claims priority to and benefit of, U.S. application Ser. No. 17/187,008, filed Feb. 26, 2021, and entitled "REPAIR METHODS AND SYSTEMS FOR HONEYCOMB STRUCTURES IN GAS TURBINE ENGINES," which is incorporated by reference herein in its entirety for all purposes.

FIELD

The present disclosure relates to repair systems for gas turbine engines, and more specifically, to methods and systems for adhering braze tape to a honeycomb structure.

BACKGROUND

A gas turbine engine typically includes a fan section, a compressor section, a combustor section, and a turbine section. A fan section may drive air along a bypass flow path while a compressor section may drive air along a core flow path. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines. The turbine section includes multiple stages of blades and vanes. As fluid flows through the turbine section, the flow causes the blades to rotate about an axis of rotation. The vanes, positioned between each row of blades, are used to redirect the flow in order to maximize the power received by the downstream blades.

Within the interlacing structures of the turbine sections, open-face honeycomb structures are used to provide gas-path seal between moving parts. Honeycomb structures may also be used as sacrificial materials which rotating blades rub against the honeycomb structure while maintaining a predetermined tip clearance during engine operation.

SUMMARY

A method of applying a braze component to a honeycomb structure is disclosed herein. The method may comprise: applying at least a partial vacuum within a chamber, the chamber defined at least partially by a vacuum device and a cover, the honeycomb structure disposed within the chamber, the braze component disposed between the honeycomb structure and the cover; pulling the cover towards the braze component in response to applying the partial vacuum; and pulling the braze component into a plurality of hexagonal cells defined by the honeycomb structure in response to pulling the cover towards the braze component.

In various embodiments, the braze component may comprise a braze tape. The method may further comprise disposing the honeycomb structure on a porous platform prior to applying the partial vacuum. The porous platform may be disposed within the vacuum device prior to applying the partial vacuum. The method may further comprise disposing the braze component on the honeycomb structure, the honeycomb structure disposed between the porous platform and the braze component. The method may further comprise creating an air-tight seal in the chamber between the cover and the vacuum device. The honeycomb structure may be a portion of a honeycomb seal land for a sealing system in a turbine section of a gas turbine engine. The method may further comprise heating the cover to soften the braze component while pulling the cover.

A method of repairing a honeycomb seal land of a turbine vane assembly is disclosed herein. The method may comprise: pulling a braze component into a plurality of cells of a honeycomb structure in response to applying at least a partial vacuum within a chamber, the braze component and the honeycomb structure disposed on a porous platform within the chamber; tack welding a second end of the honeycomb structure to an internal surface of an inner diameter platform of a vane assembly, the second end opposite a first end, the second end proximate the braze component; and brazing the braze component to couple the honeycomb structure to the internal surface. The braze component may be a braze tape. A vacuum device and a cover may at least partially define the chamber. The honeycomb structure may be disposed between the porous platform and the cover prior to pulling the braze component. The braze component may be disposed between the cover and the honeycomb structure prior to pulling the braze component. The method may further comprise heating the cover during pulling the braze component. The method may further comprise a weight on the cover prior to pulling the braze component.

A system for applying a braze tape to a honeycomb structure for use in a gas turbine engine is disclosed herein. The system may comprise: a vacuum device; a cover configured to create an air-tight seal with the vacuum device and define a chamber therein; and a porous platform disposed within the chamber, the porous platform configured to receive the honeycomb structure thereon.

In various embodiments, the cover is configured to be heated when the system is in operation. The system may further comprise a controller in operable communication with the vacuum device, the controller configured to command the vacuum device to supply at least a partial vacuum. The porous platform may extend from a first side of the vacuum device to a second side of the vacuum device. The system may be configured to pull the braze tape into a plurality of cells of the honeycomb structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A illustrates a top view of a honeycomb structure, in accordance with various embodiments;

FIG. 3B illustrates a cross-section view along section line A-A from FIG. 3A of the honeycomb structure with a braze component disposed thereon, in accordance with various embodiments;

DETAILED DESCRIPTION

Figure 1:
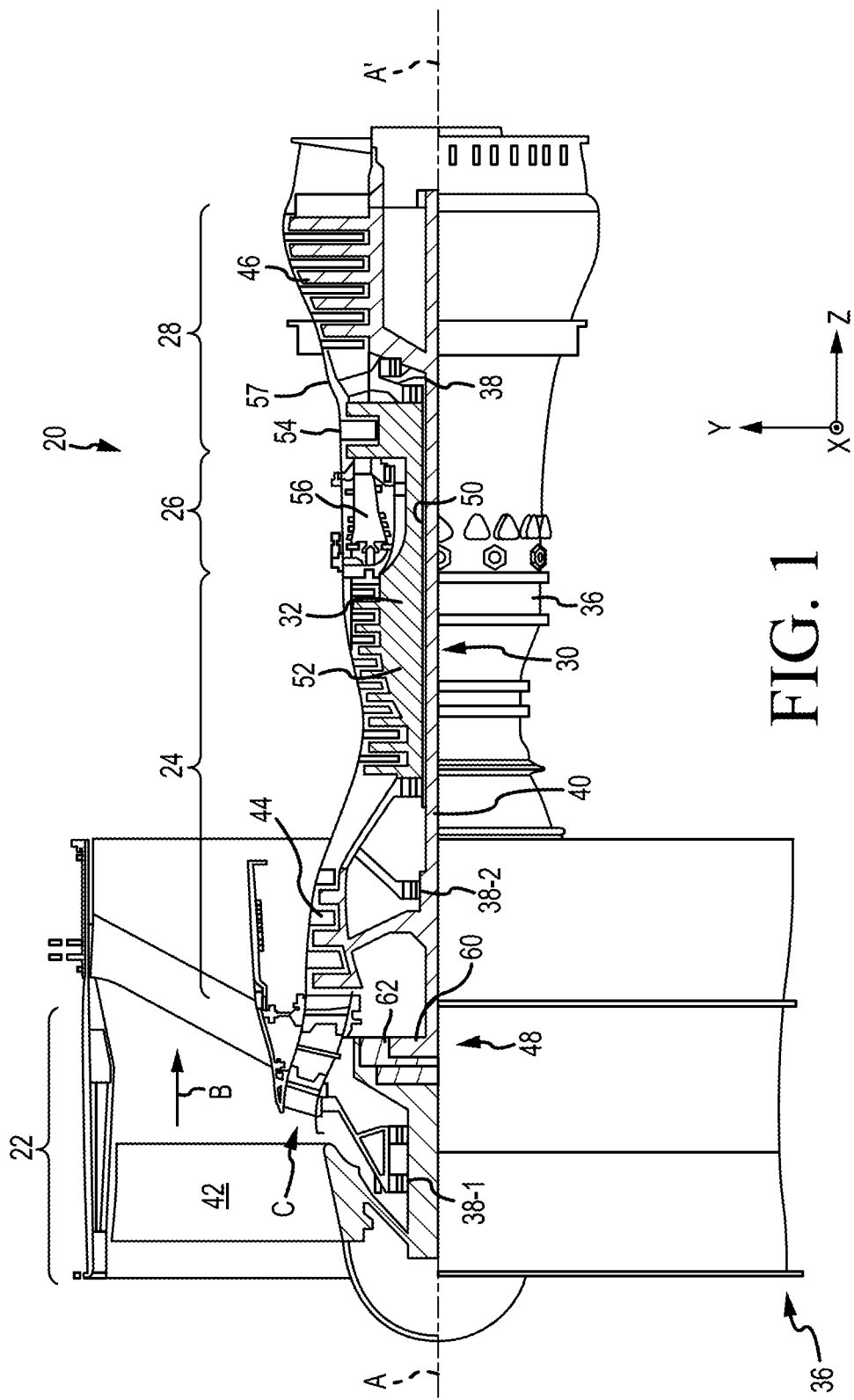
FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Any reference related to fluidic coupling to serve as a conduit for cooling airflow and the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. A first component that is "radially outward" of a second component means that the first component is positioned at a greater distance away from the engine central longitudinal axis than the second component. As used herein, "distal" refers to the direction outward, or generally, away from a reference component. As used herein, "proximal" refers to a direction inward, or generally, towards the reference component.

In various embodiments, honeycomb structures are brazed onto the turbine vanes as part of the repair process during a maintenance shop visit (e.g., at an inner diameter (ID) or an outer diameter (OD) of a respective turbine vane. In various embodiments, braze tape is adhered onto the honeycomb structure prior to coupling the honeycomb structure to the turbine vane. After adhering the braze tape to the honeycomb structure, the honeycomb structure may then be tack welded onto the turbine vane prior to undergoing brazing in a furnace, in accordance with various embodiments. In various embodiments, methods and systems disclosed herein may provide significantly more consistent braze tape application and/or a controlled output of braze tape application to honeycomb structures compared to typical processes. For example, a braze tape adhered as disclosed herein may be applied evenly across the cells of the honeycomb structure, pulling in the braze tape all at once in a single iteration, in accordance with various embodiments. In doing so, the methods and systems may reduce ergonomic risks of typical manual processes that have repetitive manual force exerted manually by an individual performing a repair, in accordance with various embodiments. In various embodiments, the systems and methods disclosed herein may be scaled to allow operations of multiple honeycomb structures concurrently, vastly increasing process output. In various embodiments, overall productivity and safety may be achieved by the systems and methods disclosed herein.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. In operation, fan section 22 can drive coolant (e.g., air) along a path of bypass airflow B while compressor section 24 can drive coolant along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the Z direction on the provided X-Y-Z axes. It should be understood that various bearing systems 38 at various locations may alternatively or additionally be provided, including, for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine 20 may comprise an industrial gas turbine (IGT) or a geared aircraft engine, such as a geared turbofan, or non-geared aircraft engine, such as a turbofan, or may comprise any gas turbine engine as desired.

Figure 2:
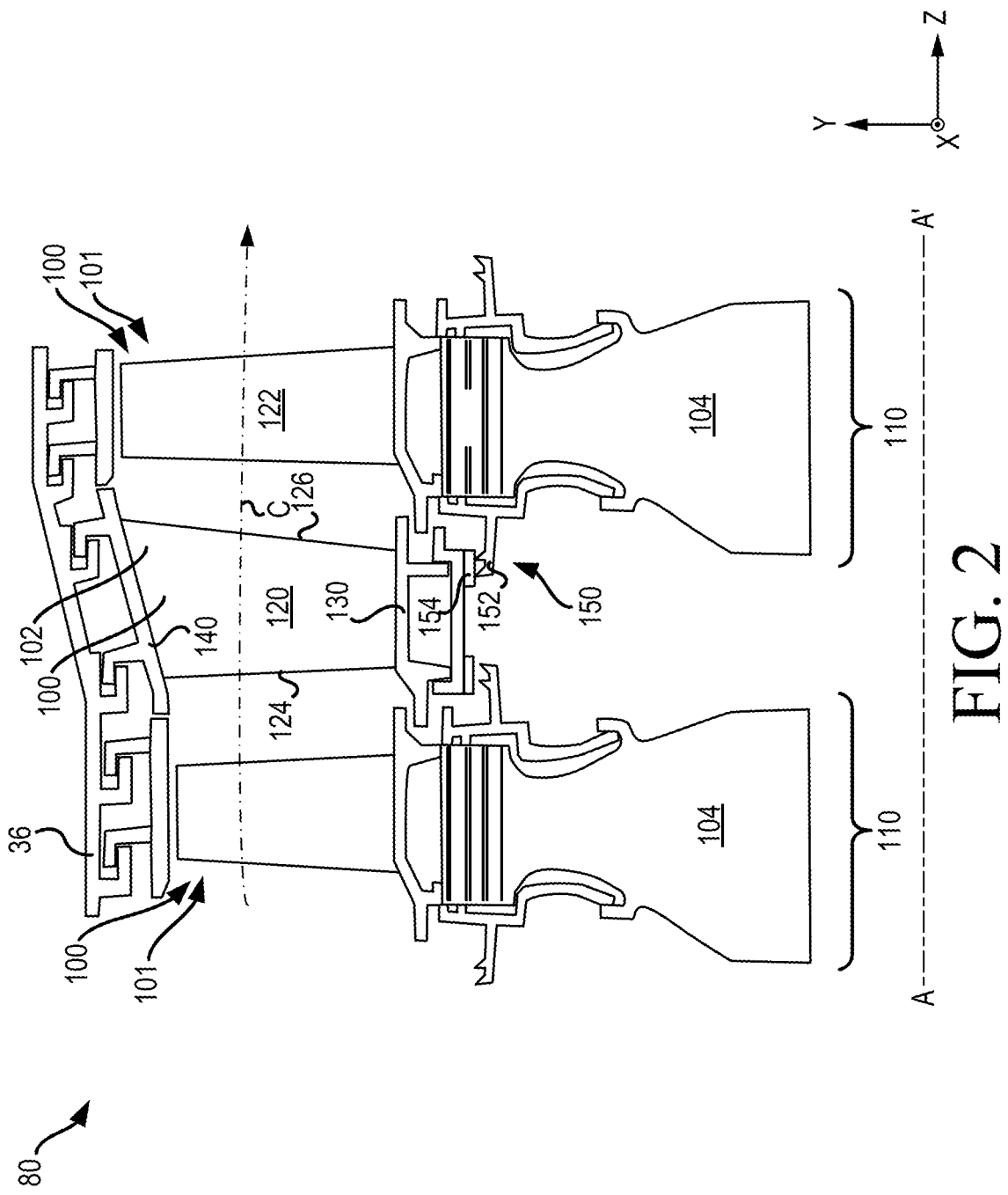
FIG. 2 illustrates a cross-sectional view of an engine section of gas turbine engine, according to various embodiments.

Referring now to FIG. 2 and still to FIG. 1, according to various embodiments, each of low pressure compressor 44, high pressure compressor 52, low pressure turbine 46, and high pressure turbine 54 in gas turbine engine 20 may comprise one or more stages or sets of rotating blades 101 and one or more stages or sets of stationary vanes 102 axially interspersed with the associated blade stages but non-rotating about engine central longitudinal axis A-A'. The compressor and turbine sections 24, 28 may be referred to as rotor assemblies 110. Each compressor stage and turbine stage may comprise multiple interspersed stages of blades 101 and vanes 102. Within the rotor assemblies 110 of gas turbine engine 20 are multiple rotor disks, which may include one or more cover plates or minidisks. The blades 101 rotate about engine central longitudinal axis A-A', while the vanes 102 remain stationary with respect to engine central longitudinal axis A-A'. For example, FIG. 2 schematically shows, by example, a portion of an engine section 80, which is illustrated as a turbine section 28 of gas turbine engine 20. It will be understood that the repair systems and methods in the present disclosure are not limited to the turbine section 28 and could extend to other sections of the gas turbine engine 20, including but not limited to compressor section 24.

Engine section 80 may include alternating rows of blades 101 and vanes 102 comprising airfoils 100 that extend into the core flow path C. For example, the rotor assemblies 110 can carry a plurality of rotating blades 101, while each vane assembly can carry a plurality of vanes 102 that extend into the core flow path C. Blades 101 create or extract energy (in the form of pressure) from the core airflow that is communicated through the gas turbine engine 20 along the core flow path C. Vanes 102 direct the core airflow to the blades 101 to either add or extract energy. Vanes 102 may be arranged circumferentially about engine central longitudinal axis A-A'. In various embodiments, a set of blades 101 may be coupled about a circumference of a generally circular disk 104, which may be disposed radially inward of core flow path C. Disk 104 with blades 101 may comprise a rotor assembly 110 configured to rotate about engine central longitudinal axis A-A'. Blades 101 and vanes 102 may generally be referred to as airfoils 100.

Each airfoil 100, illustrated as vane 102, has an airfoil body 120 having a leading edge 124 facing a forward direction in the gas turbine engine 20 and a trailing edge 126 facing an aft direction. An airfoil 100 may include a pressure side wall (i.e. having a generally concave surface) and a suction side wall (i.e. having a generally convex surface) joined together at the respective leading edge 124 and trailing edge 126. Each vane 102 may include an inner diameter (ID) platform 130 at an inner diameter end of the airfoil body 120 and an outer diameter (OD) platform 140 disposed at an OD end of the airfoil body 120. For example, the airfoil body 120 may extend radially outward from ID platform 130 at the inner diameter end of the airfoil body 120 to the OD platform 140 at the outer diameter end of the airfoil body 120.

Airfoil body 120, ID platform 130 and OD platform 140 may be integrally formed. As used herein, the term "integrated" or "integral" may include forming one, single continuous piece (i.e., a monolithic component). Casting may be used to form airfoils 100 of FIG. 2. Although described herein with reference to vane 102, it is contemplated herein that the repair systems and methods, as described herein, may be useful for any system or component that couples a braze component to a honeycomb structure prior to brazing, as described further herein. In this regard, the term "airfoil," as used herein, may refer to either a turbine blade 101 or a turbine vane 102, in accordance with various embodiments. In addition to blades 101 and vanes 102, it is contemplated herein that the repair system and method, as described herein, may be used for other components of a gas turbine engine 20 with honeycomb structures.

In various embodiments, engine section 80 further comprises a sealing system 150 between blades 101 and vanes 102. For example, the sealing system 150 may comprise a knife edge 152 extending radially outward from a flange 151 of blade 101 and a honeycomb seal land 154 disposed radially outward from the knife edge 152. In various embodiments, the knife edge 152 may be spaced apart radially from the honeycomb seal land 154 prior to operation and configured to contact the knife edge 152 during normal operation. In this regard, the honeycomb seal land 154 may act as a sacrificial material which the knife edge 152 abrades to maintain a desired tip clearance during operation of the gas turbine engine 20. In various embodiments, the repair systems and methods disclosed herein may be utilized to repair honeycomb seal land 154. In various embodiments, the honeycomb seal land 154 may be coupled to a radially inner surface of the ID platform 130 of vanes 102. In this regard, the honeycomb seal land 154 may be an annular structure extending circumferentially around the ID platform 130 of blades 101.

Referring now to FIG. 3A, a portion of a honeycomb structure 300 is illustrated for use in a gas turbine engine (e.g., gas turbine engine 20 from FIG. 1), in accordance with various embodiments. The honeycomb structure 300 may be coupled to an inner diameter surface of an ID platform of a vane assembly (e.g., ID platform 120 of vanes 102 from FIG. 2). Although described herein as being used in turbine section 80 from FIG. 2, the present disclosure is not limited in this regard. For example, honeycomb structure 300 may be used in cryogenic rocket engine turbopumps as a damper seal at a balance piston location and in application in high-pressure centrifugal compressors, in accordance with various embodiments. The honeycomb structure 300 may comprise a range of materials, such as stainless steel, aluminum, plastic, or the like.

In various embodiments, the honeycomb structure 300 comprises a plurality of hexagonal cells 310. Each cell in the plurality of hexagonal cells 310 is disposed adjacent to an adjacent hexagonal cell in the plurality of hexagonal cells 310. In various embodiments, the honeycomb structure 300 may provide a material with minimal density (e.g., lower weight) and relatively high out-of-plane compression properties and out-out-of-plane shear properties.

Referring now to FIG. 3B, a honeycomb assembly 400 with a honeycomb structure 300 and a braze component 350 coupled thereto along section line A-A from FIG. 3A and manufactured in accordance with the repair systems and methods described further herein is illustrated, in accordance with various embodiments. The honeycomb assembly 400 comprises the honeycomb structure 300 and the braze component 350. Each cell in the plurality of hexagonal cells 310 extends from a first end 312 to a second end 314. Each cell in the plurality of hexagonal cells 310 defines a hexagonal cavity therein. In various embodiments, the braze component 350 is adhered to the honeycomb structure 300 via system 500 illustrated in FIGS. 4A and 4B and manufactured in accordance with method 600 from FIG. 5.

In various embodiments, the braze component 350 comprises braze tape. The braze component 350 may comprise a polymer bonded flexible tape comprising a nickel-based super alloy or a cobalt based super alloy and a brazing filler metal power. In various embodiments, the braze component 350 is flexible and configured for a diffusion brazing process.

In various embodiments, the honeycomb assembly 400 made in accordance with system 500 and method 600 as described further herein provides a more consistent and controlled honeycomb assembly 400 relative to typical manual systems and processes for applying a braze component 350 to a honeycomb assembly 400. For example, the braze component 350 may be disposed more uniformly and at a more consistent depth relative to the second end 314 compared to a typical manually applied braze component 350. In various embodiments, "more uniformly" refers to a standard deviation in local density per square inch being smaller relative to a typical standard deviation in local density per square inch of the braze component 350. In various embodiments, "more consistent depth," as disclosed herein, refers to a standard deviation in local depth of the braze component 350 measured periodically being smaller relative to a typical standard deviation of typical honeycomb assemblies applied via manual processes. Although illustrated as being a depth below the second end 314, the present disclosure is not limited in this regard. For example, the braze component 350 may be substantially flush with the second end 314, or extend above the second end 314, in accordance with various embodiments.

Figure 4B:
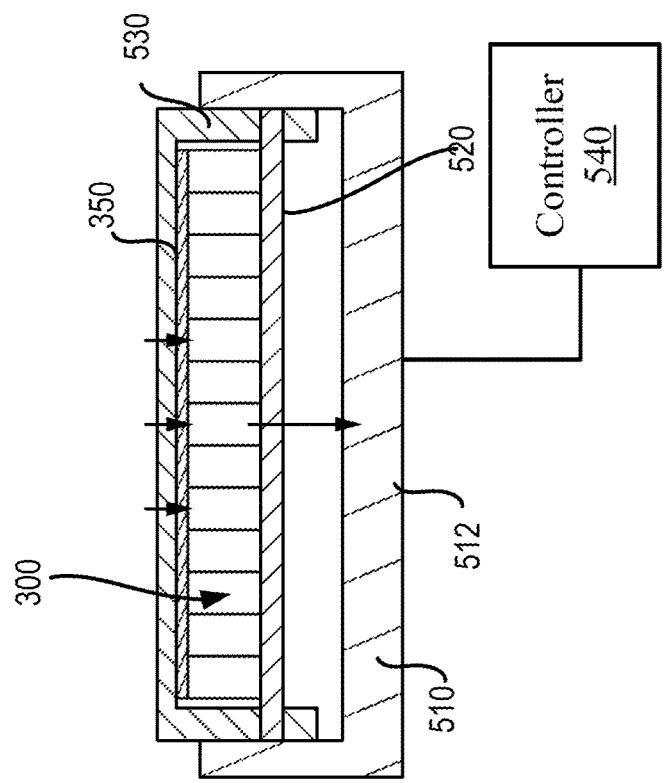
FIG. 4B illustrates a cross-sectional view of a system for adhering a braze component to a honeycomb structure during operation, in accordance with various embodiments.
Figure 4A:
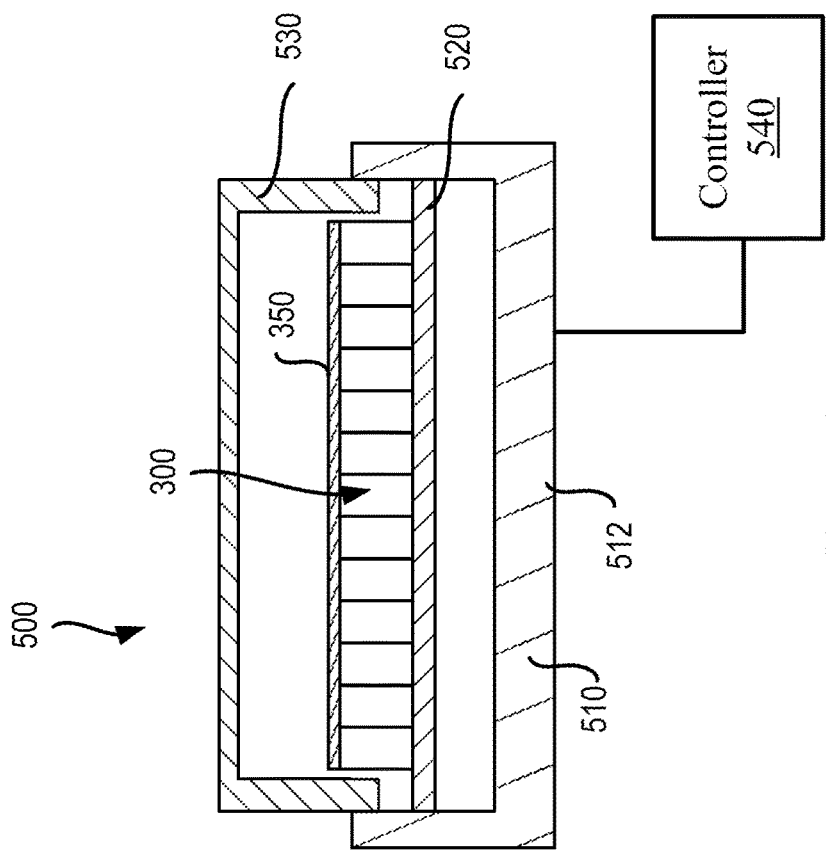
FIG. 4A illustrates a cross-sectional view of a system for adhering a braze component to a honeycomb structure prior to operation, in accordance with various embodiments.

Referring now to FIGS. 4A and 4B, a cross-sectional view of a system 500 for applying a braze component 350 to a honeycomb structure 300 to form a honeycomb assembly 400 in accordance with FIG. 3B is illustrated, in accordance with various embodiments. The system 500 comprises a vacuum device 510, a porous platform 520, and a cover 530. In various embodiments, the porous platform 520 is disposed within the vacuum device 510. The porous platform 520 is configured to receive a honeycomb structure 300 thereon. Although illustrated as a single vacuum device, the present disclosure is not limited in this regard. In various embodiments, a vacuum device 510 may be separate from a housing that houses the vacuum device therein and is configured to create an air-tight chamber for the honeycomb structure 300 and braze component 350 to be disposed within.

In various embodiments, a braze component 350 may be placed on a second end 314 of the honeycomb structure 300 prior to placing the cover 530 thereon. The cover 530 is placed over the honeycomb structure 300 to create an air-tight chamber and/or allow a suction from the vacuum device 510 to function (i.e., for the suction from the vacuum device 510 to pull the cover 530 towards the vacuum device 510, and also creating a force on the braze component 350 directed towards the honeycomb structure 300). In various embodiments, the porous platform 520 and the honeycomb structure 300 allows the vacuum device 510 to be in fluid communication with an internal surface of the braze component 350. In this regard, suction from the vacuum device 510 pulls the internal surface of the braze component 350 towards the suction as illustrated in FIG. 4B.

In various embodiments, the vacuum device 510 may be any vacuum pump known in the art, such as a positive displacement pump, a momentum transfer pump, a regenerative pump, or the like. In various embodiments, the cover 530 and the vacuum device 510 may be sealed when performing method 600 described further herein. In this regard, the cover 530 may be pulled towards a first end 512 of the vacuum device 510 in response to the vacuum device 510 producing a suction towards the first end 512 as shown in FIG. 4B. In various embodiments, the honeycomb structure 300 may be arcuate in shape and configured for a portion of a honeycomb seal land 154 from FIG. 2. In various embodiments, the honeycomb structure 300 may be a flat component. In this regard, a shape of the honeycomb structure 300 is not limited by the present disclosure.

In various embodiments, the system 500 may further include a weight placed on top of cover 530 to further apply pressure of the braze component 350 into the plurality of hexagonal cells 310 of the honeycomb structure 300. In this regard, a balance between suction force and/or an external weight may provide a consistent and controlled application of braze component 350 to the honeycomb structure 300, in accordance with various embodiments.

In various embodiments, the cover 530 may be configured to be heated during application of the braze component 350 to the honeycomb structure 300. In this regard, heating the braze component 350 may soften the braze component 350 making it easier to adhere the braze component 350 to the honeycomb structure 300. In various embodiments, the heating device may include an electrical resistance heater. In various embodiments, the electrical resistance heater may be integral with the cover 530, spaced apart from the cover 530, or the like.

In various embodiments, the system 500 may further comprise a controller 540. The controller 540 may be in operable communication with the vacuum device 510. In this regard, the controller 540 may be operable to command the vacuum device 510 to supply at least a partial vacuum, in accordance with various embodiments.

Figure 5:
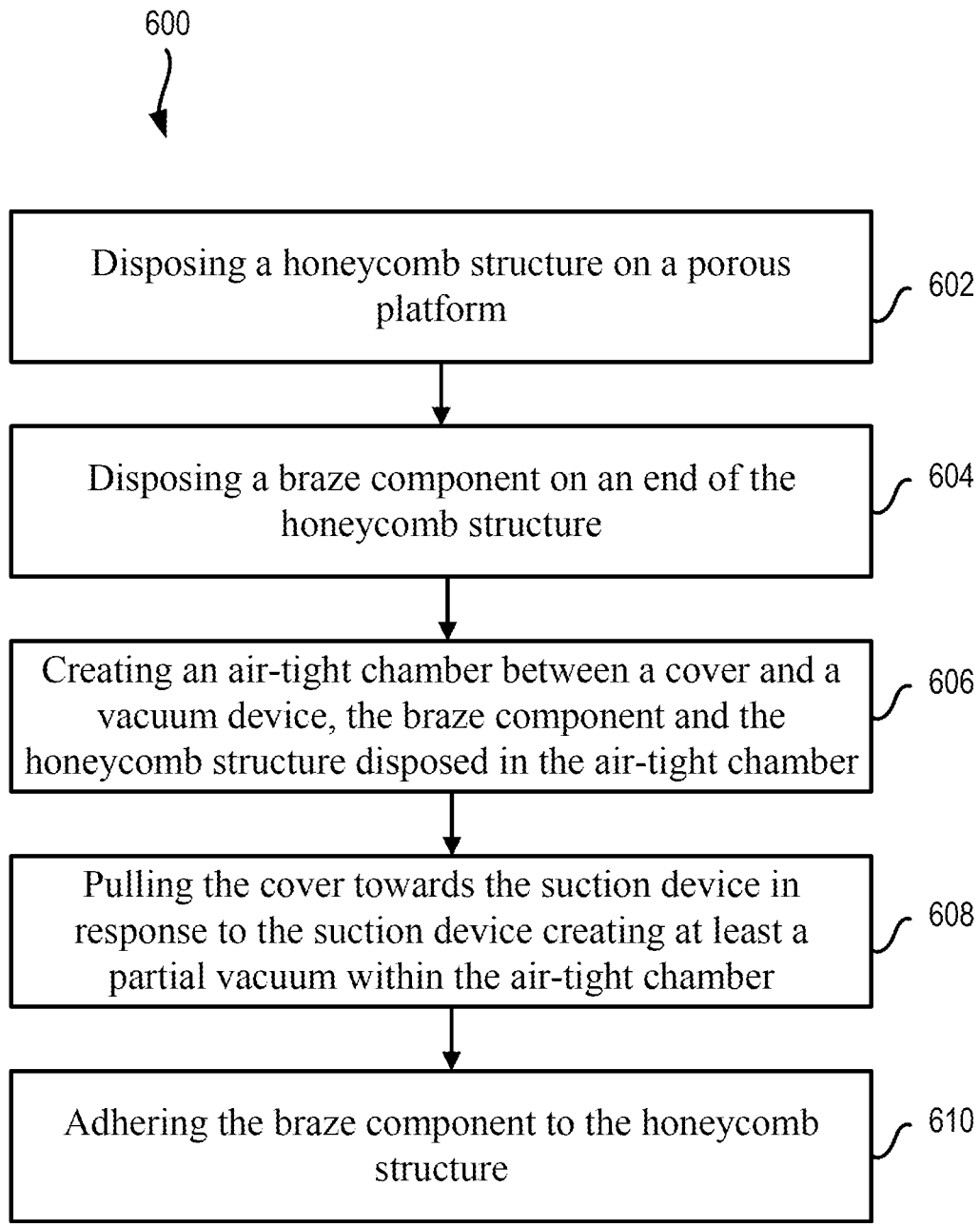
FIG. 5 illustrates a method of adhering a braze component to a honeycomb structure, in accordance with various embodiments.

Referring now to FIG. 5, a method 600 of applying a braze component to a honeycomb structure is illustrated, in accordance with various embodiments. The method 600 comprises disposing a honeycomb structure on a porous platform within a vacuum device (step 602). The honeycomb structure may be in accordance with honeycomb structure 300 from FIGS. 3-4B.

The method 600 further comprises disposing a braze component on a second end of the honeycomb structure (step 604). The second end is opposite a first end of the honeycomb structure, defining a plurality of hexagonal cells therebetween.

In various embodiments, the method 600 further comprises creating an air-tight chamber between a cover and the vacuum device, the honeycomb structure and the braze component being disposed within the air-tight chamber (step 606).

In various embodiments, the method 600 further comprises pulling the cover towards the suction device in response to the suction device creating at least a partial vacuum within the air-tight chamber (step 608). A suction force created by the partial vacuum may be supplied relatively evenly across a plurality of cells of the honeycomb structure. In this regard, the braze component may be more consistent and controllable relative to typical systems, in accordance with various embodiments. In various embodiments, the suction force may be calibrated to create an optimal pulling force of the braze component into a plurality of cells of the honeycomb structure.

In various embodiments, the method 600 further comprises adhering the braze component to the honeycomb structure within a plurality of hexagonal cells of the honeycomb structure in response to the cover applying a force against the braze component (step 610).

In various embodiments, the cover may be heated during steps 608 and 610. For example, an electrical resistance heater may supply a current to the cover, in accordance with various embodiments. In this regard, the braze component may be softer and adhere more easily than without heating the cover. In various embodiments, a weight may be placed on the cover prior to applying the partial vacuum in step 608.

In various embodiments, method 600 may produce the honeycomb assembly 400 from FIG. 3B. In various embodiments, a method of repairing a honeycomb seal land may comprise the method 600, tack welding a resultant honeycomb assembly (e.g., honeycomb assembly 400 to an inner diameter surface of a platform (e.g., ID platform 130 from FIG. 2), and brazing the platform and the resultant honeycomb assembly. In various embodiments, tack welding may be performed on the second end 314 of the honeycomb structure 300 proximate the braze component 350. In this regard, an open face honeycomb structure may be repaired and configured to be disposed opposite a knife edge (e.g., knife edge 152 from FIG. 2), in accordance with various embodiments.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method comprising:
applying at least a partial vacuum within a chamber, the chamber defined at least partially by a vacuum device and a cover, a honeycomb structure disposed within the chamber, a braze component disposed between the honeycomb structure and the cover;

pulling the cover towards the braze component in response to applying the partial vacuum;

pulling the braze component into a plurality of hexagonal cells defined by the honeycomb structure in response to pulling the cover towards the braze component; and disposing the braze component and the honeycomb structure on a portion of a platform of a vane assembly; and brazing the braze component to couple the honeycomb structure to the portion of the platform to form a seal land of the vane assembly.

2. The method of claim 1, wherein the braze component comprises a braze tape.

3. The method of claim 1, further comprising disposing the honeycomb structure on a porous platform prior to applying the partial vacuum.

4. The method of claim 3, wherein the porous platform is disposed within the vacuum device prior to applying the partial vacuum.

5. The method of claim 4, further comprising disposing the braze component on the honeycomb structure, the honeycomb structure disposed between the porous platform and the braze component.

6. The method of claim 5, further comprising creating an air-tight seal in the chamber between the cover and the vacuum device.

7. The method of claim 1, further comprising heating the cover to soften the braze component while pulling the cover.

8. The method of claim 1, further comprising tack welding the honeycomb structure to the portion of the platform prior to the brazing.

* * * * *